United States Patent
Wang et al.

(10) Patent No.: US 11,902,524 B2
(45) Date of Patent: Feb. 13, 2024

(54) DECODING METHOD AND DEVICE FOR QUANTIZATION BLOCK, VIDEO DECODING METHOD, AND ELECTRONIC DEVICE

(71) Applicant: PEKING UNIVERSITY SHENZHEN GRADUATE SCHOOL, Shenzhen (CN)

(72) Inventors: Ronggang Wang, Shenzhen (CN); Zhenyu Wang, Shenzhen (CN); Wen Gao, Shenzhen (CN)

(73) Assignee: PEKING UNIVERSITY SHENZHEN GRADUATE SCHOOL, Shenzhen (CN)

( * ) Notice: Subject to any disclaimer, the term of this patent is extended or adjusted under 35 U.S.C. 154(b) by 281 days.

(21) Appl. No.: 17/428,806

(22) PCT Filed: Mar. 7, 2019

(86) PCT No.: PCT/CN2019/077292
§ 371 (c)(1),
(2) Date: Aug. 5, 2021

(87) PCT Pub. No.: WO2020/172908
PCT Pub. Date: Sep. 3, 2020

(65) Prior Publication Data
US 2022/0345706 A1    Oct. 27, 2022

(30) Foreign Application Priority Data
Feb. 27, 2019 (CN) .......................... 201910144295.2

(51) Int. Cl.
*H04N 19/124* (2014.01)
*H04N 19/105* (2014.01)
(Continued)

(52) U.S. Cl.
CPC ......... *H04N 19/124* (2014.11); *H04N 19/105* (2014.11); *H04N 19/117* (2014.11);
(Continued)

(58) Field of Classification Search
None
See application file for complete search history.

(56) References Cited

U.S. PATENT DOCUMENTS

| 8,144,784 B2 | 3/2012 | Tian et al. | |
| 2012/0163448 A1* | 6/2012 | Zheng | H04N 19/61 |
| | | | 375/E7.138 |
| 2014/0210652 A1* | 7/2014 | Bartnik | H03M 7/40 |
| | | | 341/67 |

FOREIGN PATENT DOCUMENTS

| CN | 102377994 A | 3/2012 |
| CN | 103299638 A | 9/2013 |

* cited by examiner

*Primary Examiner* — Edemio Navas, Jr.

(57) ABSTRACT

An embodiment of the present description provides a decoding method and device for a quantization block as well as an electronic device. The method comprises: determining the scanning order of quantization coefficients in the quantization block, initializing the scanning position of the quantization coefficients, and decoding a run-length; adding a subscript value of the current scanning position and the value of the run-length to obtain the scanning position of nonzero coefficients, decoding the values of the nonzero coefficients; judging whether the subscript value of the nonzero coefficients is the maximum subscript value, if yes, ending the decoding of the quantization block; if not, judging whether there are undecoded nonzero coefficients, and if there are no undecoded nonzero coefficients, ending the decoding of the quantization block; if there are undecoded nonzero coefficients, adding 1 to the subscript value of the decoded nonzero coefficients to obtain an updated (Continued)

current scanning position, taking the current scanning position as the initial scanning position to decode the next run-length until the decoding of the quantization block is completed. The technical solution of the present application can improve the decoding efficiency of quantization block.

15 Claims, 4 Drawing Sheets

(51) Int. Cl.
  *H04N 19/117* (2014.01)
  *H04N 19/12* (2014.01)
  *H04N 19/129* (2014.01)
  *H04N 19/172* (2014.01)
  *H04N 19/176* (2014.01)
  *H04N 19/61* (2014.01)
  *H04N 19/70* (2014.01)
  *H04N 19/80* (2014.01)
(52) U.S. Cl.
  CPC .......... *H04N 19/12* (2014.11); *H04N 19/129* (2014.11); *H04N 19/172* (2014.11); *H04N 19/176* (2014.11); *H04N 19/61* (2014.11); *H04N 19/70* (2014.11); *H04N 19/80* (2014.11)

DECODING METHOD AND DEVICE FOR QUANTIZATION BLOCK, VIDEO DECODING METHOD, AND ELECTRONIC DEVICE

CROSS-REFERENCE TO RELATED APPLICATIONS

The present application is a national stage filing under 35 U.S.C. § 371 of PCT/CN2019/077292, filed on Mar. 7, 2019 which claims priority to Chinese Application No. 201910144295.2, filed on Feb. 27, 2019. The applications are incorporated herein by reference in their entirety.

FIELD

The present disclosure relates to a field of video encoding and decoding, specifically relates to a decoding method, device and electronic device for a quantization block.

BACKGROUND

In the process of video coding and decoding, when decoding a frame of image, the coding information of each coding unit is usually decoded from the bitstream, such as the division methods of prediction units and transform units, quantization blocks, prediction information, etc. According to the prediction information, perform corresponding intra or inter prediction to obtain predicted image blocks corresponding to the prediction units, and the quantization blocks may be inversely quantized to obtain inverse transform blocks and the inverse transform blocks may be inversely transformed to obtain residual image blocks, and a residual image block may be added to a corresponding predicted image block to obtain a reconstructed image block; a reconstructed image composed of the reconstructed image blocks may be loop-filtered and provided for reference in subsequent frames.

In the prior art, in the process of entropy decoding a bitstream to obtain a quantization block, since the size of the quantization block may be relatively large, it often takes more time to decode the quantization coefficients using the existing run-length decoding method, which will reduce the decoding efficiency for a quantization block.

SUMMARY

In view of the above-mentioned facts, the purpose of the present invention is to provide a decoding method, device and electronic device for a quantization block, so as to solve the problem that when the run-length decoding method is used to decode the quantization coefficients in the prior art, it consumes a lot of time and causes the decoding efficiency of the quantization block to decrease.

In order to solve the above technical problems, the embodiments of the specification are implemented as follows:

An embodiment of this specification provides a decoding method for a quantization block, comprising:
step 110: determining the scanning order of quantization coefficients in the quantization block according to a determined scanning method;
step 120: initializing, according to the scanning order, the scanning position of the quantization coefficients in the quantization block, and decoding a run-length starting from the initial scanning position; wherein the scanning position is a subscript of the quantization coefficients under the scanning order;
step 130: adding the subscript value corresponding to the current scanning position and the value of the next run-length starting from the current scanning position to obtain a scanning position of nonzero coefficients, decoding the values of the nonzero coefficients;
step 140: judging whether the subscript value of the nonzero coefficients is the maximum subscript value, if yes, ending the decoding of the quantization block; if not, decoding the end flag bit of the quantization coefficients, and judging, according to the decoding result of the end flag bit of the quantization coefficients, whether there are undecoded nonzero coefficients, and if there are no undecoded nonzero coefficients, ending the decoding of the quantization block;
step 150: if there are undecoded nonzero coefficients, updating the current scanning position, adding 1 to the subscript value of the decoded nonzero coefficients, which is used as the current scanning position to decode the next run-length starting from the updated current scanning position, and return to the step 130.

Optionally, the step of determining the scanning order of quantization coefficients in the quantization block according to a determined scanning method comprises:
determining the scanning order of the quantization coefficients in the quantization block according to a zigzag scanning method, so that the two-dimensional quantization block is converted into a one-dimensional array based on the scanning order.

Optionally, the step of decoding a run-length comprises:
step 310: pre-configuring a variable, and the initial value of the variable is set as zero;
step 320: parsing a bitstream in turn to obtain binary symbols, and for each binary symbol, judging whether the binary symbol is 1 or not: if yes, setting the current value of the variable as the value of the run-length, and ending the run-length decoding; if not, adding 1 to the value of the variable to obtain an updated current value of the variable, and judging whether the current value of the variable is less than a threshold;
step 330: if the current value of the variable is less than the threshold, returning to step 320;
step 340: if the current value of the variable is greater than or equal to the threshold, parsing the subsequent binary symbol string in a zero-order exponential Golomb code manner to obtain a value corresponding to the subsequent binary symbol string, and adding the value corresponding to the subsequent binary symbol string to the threshold to obtain the value of the run-length, and ending the run-length decoding.

Optionally, the threshold is set to 2, 4, 8, 16, or 32.

Optionally, after the step of decoding the values of the nonzero coefficients, the method further comprises: assigning the values of the nonzero coefficients obtained by decoding to the quantization coefficients at corresponding positions in the quantization block according to the scanning order.

An embodiment of this specification provides a video decoding method, comprising:
decoding a bitstream to get division information, prediction information and quantization blocks;
obtaining predicted image blocks through prediction technologies according to the prediction information;

performing inverse quantization and inverse transformation on the quantization blocks to obtain residual image blocks;

adding a residual image block to a corresponding predicted image block to obtain a reconstructed image block;

performing deblocking filtering on the reconstructed image formed by reconstructed image blocks to obtain a reference image for reference in subsequent frames;

It also includes that the quantization blocks are decoded from the bitstream by the above-mentioned quantization block decoding method.

An embodiment of this specification provides a decoding device for a quantization block, comprising a processor, configured to execute the following program modules stored in a memory:

determining module, for determining the scanning order of quantization coefficients in the quantization block according to a determined scanning method;

initialization module, for initializing, according to the scanning order, the scanning position of the quantization coefficients in the quantization block, and decoding a run-length starting from the initial scanning position; wherein the scanning position is a subscript of the quantization coefficients under the scanning order;

decoding module, for adding the subscript value corresponding to the current scanning position and the value of the next run-length starting from the current scanning position to obtain a scanning position of nonzero coefficients, decoding the values of the nonzero coefficients;

judging module, for judging whether the subscript value of the nonzero coefficients is the maximum subscript value, if yes, ending the decoding of the quantization block; if not, decoding the end flag bit of the quantization coefficients, and judging, according to the decoding result of the end flag bit of the quantization coefficients, whether there are undecoded nonzero coefficients, and if there are no undecoded nonzero coefficients, ending the decoding of the quantization block;

updating module, for updating the current scanning position if there are undecoded nonzero coefficients, adding 1 to the subscript value of the decoded nonzero coefficients, which is used as the current scanning position to decode the next run-length starting from the updated current scanning position, and for calling the decoding module.

Optionally, the determining module is further configured to perform: determining the scanning order of the quantization coefficients in the quantization block according to a zigzag scanning method, so that the two-dimensional quantization block is converted into a one-dimensional array based on the scanning order.

Optionally, the initialization module is further configured to perform the following operations:

step 310: pre-configuring a variable, and the initial value of the variable is set as zero;

step 320: parsing a bitstream in turn to obtain binary symbols, and for each binary symbol, judging whether the binary symbol is 1 or not: if yes, setting the current value of the variable as the value of the run-length, and ending the run-length decoding; if not, adding 1 to the value of the variable to obtain an updated current value of the variable, and judging whether the current value of the variable is less than a threshold;

step 330: if the current value of the variable is less than the threshold, returning to step 320;

step 340: if the current value of the variable is greater than or equal to the threshold, parsing the subsequent binary symbol string in a zero-order exponential Golomb code manner to obtain a value corresponding to the subsequent binary symbol string, and adding the value corresponding to the subsequent binary symbol string to the threshold to obtain the value of the run-length, and ending the run-length decoding.

Optionally, the decoding module is further configured to perform:

after the step of decoding the values of the nonzero coefficients, assigning the values of the nonzero coefficients obtained by decoding to the quantization coefficients at corresponding positions in the quantization block according to the scanning order.

An embodiment of this specification provides an electronic device, comprises a memory, a processor, and a computer program stored on the memory and capable of running on the processor, wherein, the computer program can be executed by the processor to perform the decoding method for a quantization block.

At least one of the above technical solutions adopted in the embodiments of the specification can achieve the following beneficial effects:

The present invention discloses: determining the scanning order of quantization coefficients in the quantization block, initializing the scanning position of the quantization coefficients, and decoding a run-length; adding a subscript value of the current scanning position and the value of the run-length to obtain the scanning position of nonzero coefficients, decoding the values of the nonzero coefficients; judging whether the subscript value of the nonzero coefficients is the maximum subscript value, if yes, ending the decoding of the quantization block; if not, judging whether there are undecoded nonzero coefficients, and if there are no undecoded nonzero coefficients, ending the decoding of the quantization block; if there are undecoded nonzero coefficients, adding 1 to the subscript value of the decoded nonzero coefficients to obtain an updated current scanning position, taking the current scanning position as the initial scanning position to decode the next run-length until the decoding of the quantization block is completed. The technical solution of the present application can improve the decoding efficiency of quantization block.

BRIEF DESCRIPTION OF THE DRAWINGS

In order to more clearly illustrate the embodiments of the specification or the technical solutions in the prior art, the drawings used in the embodiments or the prior art description will be briefly introduced below, and obviously, the drawings in the following description are only some of the embodiments described in the specification, and those skilled in the art may obtain other drawings according to these drawings without any creative work.

DETAILED DESCRIPTION OF EMBODIMENTS

In order to enable the skilled in the art to better understand the technical solutions in the specification, the technical solutions in the embodiments of the specification will be clearly and completely described below with reference to the figures of the embodiments of the specification, and obviously, the described embodiments are only parts of the embodiments of the present application, but not all. All other embodiments obtained by the skilled in the art based on the embodiments of the specification without any creative work shall fall within the scope of the present application.

Figure 1:
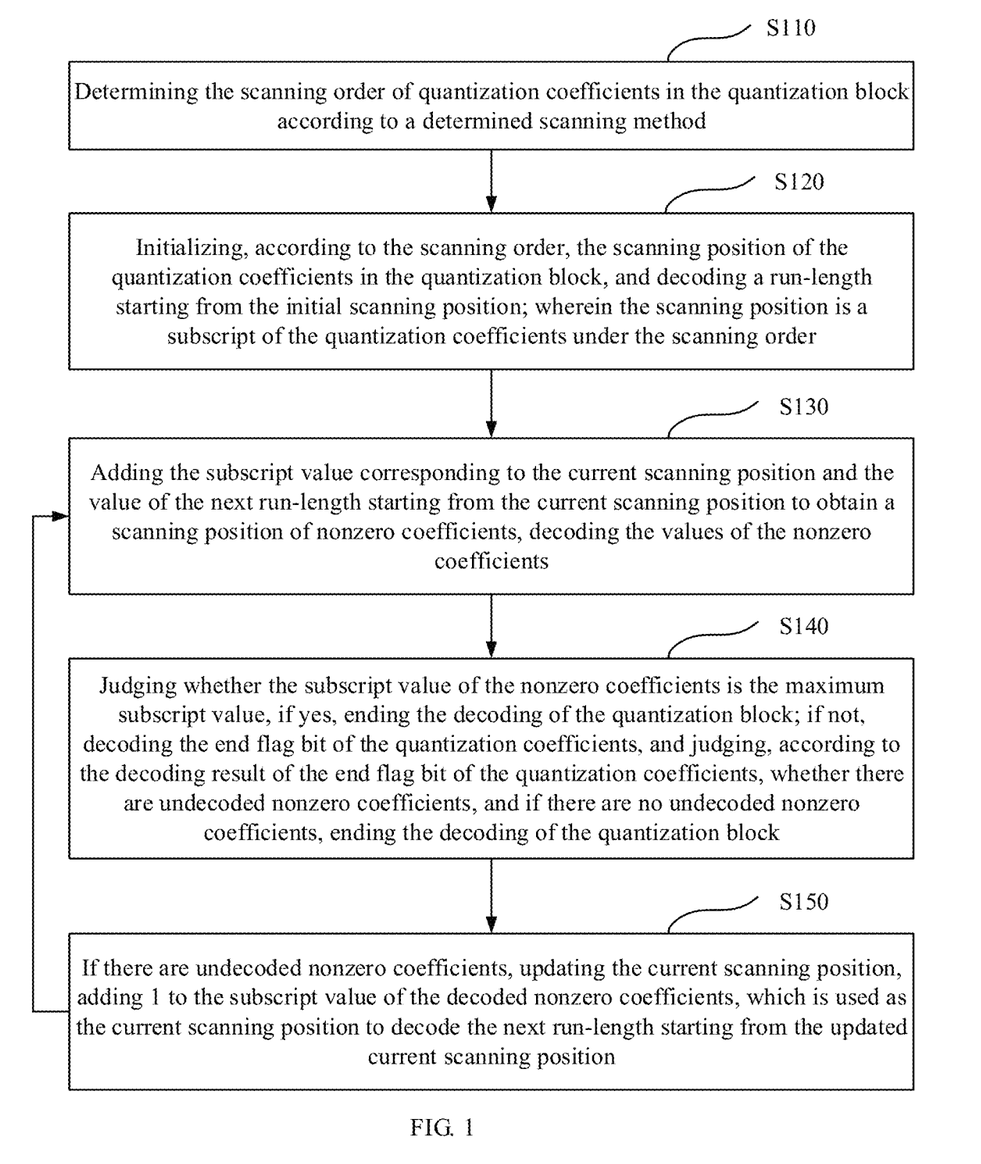
FIG. 1 is a schematic flowchart of a decoding method for a quantization block according to an embodiment of the specification.

FIG. 1 is a schematic flowchart of a decoding method for a quantization block according to an embodiment of the present disclosure. The method specifically comprises:

In step S110, determining the scanning order of quantization coefficients in the quantization block according to a determined scanning method.

Figure 2:
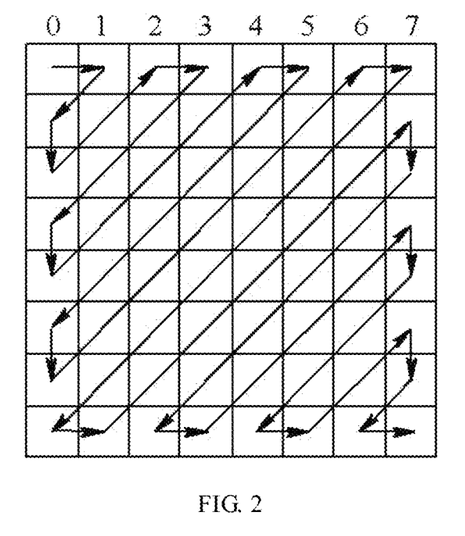
FIG. 2 is a schematic diagram of the scanning order of a typical 8×8 quantization coefficient block using a zigzag scanning method according to an embodiment of the specification.

In an embodiment of the specification, a quantization block can be expressed as a two-dimensional digital matrix, and different quantization blocks may have different widths and heights, for example, there are 8×8 quantization coefficient block, 16×16 quantization coefficient block, 32×32 quantization coefficient block, and so on. In some specific implementation process, the scanning order of the quantization coefficients in a quantization block can be determined according to a zigzag scanning method, so that a two-dimensional quantization block can be converted into a one-dimensional array based on the scanning order. The zigzag scanning method is a method for scanning matrix and is mostly used in encoding and decoding process of images and videos. FIG. 2 shows a schematic diagram of the scanning order of a typical 8×8 quantization coefficient block using a zigzag scanning method. Refer to FIG. 2, according to an oblique zigzag scanning path, all quantization coefficients in the quantization block may be scanned sequentially with an initial position as the starting point, and a one-dimensional array of the quantization block may be obtained. It should be noted that the zigzag scanning method remains the same between quantization blocks of different widths and heights, but the scanning order will be slightly different.

In step S120, initializing, according to the scanning order, the scanning position of the quantization coefficients in the quantization block, and decoding a run-length starting from the initial scanning position; wherein the scanning position is a subscript of the quantization coefficients under the scanning order.

In an embodiment of the specification, based on the one-dimensional array got in step S110 by scanning, the scanning positions of the quantization coefficients in the one-dimensional array are initialized according to the scanning order, that is, the subscripts of the quantization coefficients in the scanned quantization block are initialized. The method of performing the initialization operation may be: in accordance with the scanning order, the subscripts of the quantization coefficients of the corresponding positions are sequentially marked as 0, 1, 2, 3, 4, and so on, and the initial scanning position is set to 0.

Further, the scanning position can be represented by POS, and the run-length can be represented by Run. The run-length Run represents the number of consecutive zero coefficients that exist backwards from the current scanning position POS. Since the run-length Run is determined by a encoding end, each nonzero coefficient has a Run, and the subscript of the next nonzero coefficient can be determined by the subscript of the quantization coefficient at the starting scanning position and the value of the Run.

Figure 3:
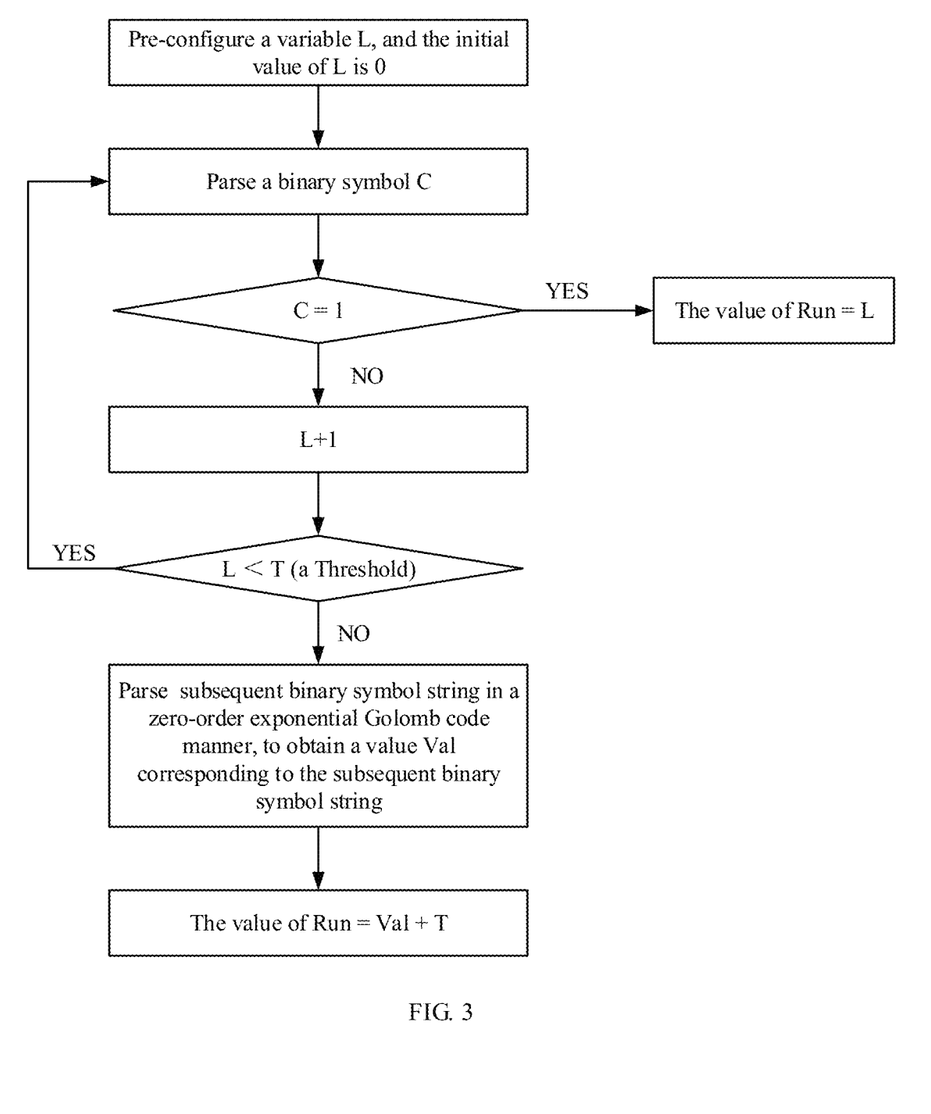
FIG. 3 is a schematic flowchart of a method for decoding run-length according to an embodiment of the specification.

FIG. 3 is a schematic flowchart of a method for decoding run-length according to an embodiment of the present disclosure. The method specifically comprises:

step 310: pre-configuring a variable, and the initial value of the variable is set as zero;

step 320: parsing a bitstream in turn to obtain binary symbols, and for each binary symbol, judging whether the binary symbol is 1 or not: if yes, setting the current value of the variable as the value of the run-length, and ending the run-length decoding; if not, adding 1 to the value of the variable to obtain an updated current value of the variable, and judging whether the current value of the variable is less than a threshold;

step 330: if the current value of the variable is less than the threshold, returning to step 320;

step 340: if the current value of the variable is greater than or equal to the threshold, parsing the subsequent binary symbol string in a zero-order exponential Golomb code manner to obtain a value corresponding to the subsequent binary symbol string, and adding the value corresponding to the subsequent binary symbol string to the threshold to obtain the value of the run-length, and ending the run-length decoding.

Wherein, the variable can be represented by L, the binary symbol can be represented by C, the threshold can be represented by T, and the value corresponding to the subsequent binary symbol string can be represented by Val; then if $L<T$, the value of the run-length Run is equal to L; if $L \geq T$, the value of the run-length Run is equal to Val+T.

Specifically, a bitstream may be decoded by an arithmetic decoding engine to obtain a binary symbol string containing only "0" and "1", that is, for the value of the encoded information, the value of the encoded information may be converted into a 0/1 symbol string by using a binarization method. Some embodiments of the disclosure mainly describe the process of de-binarizing the binary symbol string on the decoding side to obtain the value thereof, especially the process of how the run-length Run, a syntax element, is converted from a binary symbol string to a value.

In a specific embodiment, the threshold set above may be 2, 4, 8, 16, or 32.

In an embodiment of the specification, the significance of configuring the variable and the threshold is that since the initial value of the variable is zero, and every time a binary symbol in the binary symbol string is parsed, it can be determined according to the analysis result of the binary symbol whether the current value of the variable is equal to the value of the run-length Run, and when the binary symbol is not 1, the value of the variable is increased by 1, so when the value of the variable is less than the threshold, it can be directly determined that the value of the run-length Run is equal to the current value of the variable. In addition, by comparing the variable value with the threshold value, using the threshold value as the demarcation point, the binary symbols in the binary symbol string may be divided into a front part and a rear part, and the front part and the rear part in a run-length may be decoded in different ways. Compared with the method of decoding run-length in a single way, the present disclosure provides an efficient de-binarization method to optimize the decoding method of run-length, which can reduce the number of binary symbols that need to be parsed in the process of decoding run-length and improve decoding efficiency.

Further, the above-mentioned method for parsing the subsequent binary symbol string in the manner of zero-order exponential Golomb code may include the following process:

The subsequent binary symbols are decoded continuously until a binary symbol "1" is decoded, and the number of binary symbols "0" obtained by continuous decoding is recorded as k, and then continue to decode k binary symbols to form a binary number VB, wherein, the binary symbol decoded first is located at a higher position, and the binary symbol decoded later is located at a lower position. Then the value Val corresponding to the subsequent binary symbol string obtained by the manner of zero-order exponential Golomb code is equal to $2^k-1+VB$.

In step S130, adding the subscript value corresponding to the current scanning position and the value of the next run-length starting from the current scanning position to obtain a scanning position of nonzero coefficients, decoding the values of the nonzero coefficients.

In an embodiment of the specification, the scanned quantization coefficients are regarded as an array, and the scanning position is the subscript of each element in this array. The scanning position corresponds to the position of the quantization coefficient in the quantization block one-to-one. Therefore, the scanning position of the nonzero coefficient can be determined by decoding the value of the run-length in the one-dimensional array. After decoding the value of the nonzero coefficient corresponding to the scanning position, the value of the nonzero coefficient obtained by decoding can be assigned to the position of the corresponding quantization coefficient in the quantization block according to the scanning order.

In step S140, judging whether the subscript value of the nonzero coefficients is the maximum subscript value, if yes, ending the decoding of the quantization block; if not, decoding the end flag bit of the quantization coefficients, and judging, according to the decoding result of the end flag bit of the quantization coefficients, whether there are undecoded nonzero coefficients, and if there are no undecoded nonzero coefficients, ending the decoding of the quantization block.

In an embodiment of the specification, by judging whether the subscript value of the current nonzero coefficient obtained by decoding is the maximum subscript value, it can be determined whether the current nonzero coefficient is the last nonzero coefficient in the one-dimensional array. if the subscript value of the current nonzero coefficient is the maximum subscript value, it means that all the nonzero coefficients in the quantization block have been decoded, and may end the decoding of the current quantization block; if the subscript value of the current nonzero coefficient is not the maximum subscript value, there needs to decode the quantization coefficient end flag bit after the current nonzero coefficient.

In an embodiment of the specification, the quantization coefficient end flag bit can indicate whether there are any nonzero coefficients in the following. In practical applications, a variety of methods can be used to decode the quantization coefficient end flag bit.

In step S150, if there are undecoded nonzero coefficients, updating the current scanning position, adding 1 to the subscript value of the decoded nonzero coefficients, which is used as the current scanning position to decode the next run-length starting from the updated current scanning position, and return to the step 130.

In an embodiment of the specification, step S150 describes the operations when there are still undecoded nonzero coefficients in the one-dimensional array: adding 1 to the subscript value of the decoded nonzero coefficient to obtain the updated current scanning position; using the updated current scanning position as the starting scanning position to decode the next run-length, and adding the subscript value corresponding to the updated current scanning position and the value of the decoded next run-length to get the scanning position of the next nonzero coefficient, and the value of the nonzero coefficient corresponding to the scanning position is decoded. By adding the subscript value of the initial scanning position to the value of the next run-length, the scanning position of the next nonzero coefficient may be obtained. In an embodiment of the specification, by adding the initialized first scanning position POS to the value of the run-length Run starting from the first scanning position POS, the scanning position of the first nonzero coefficient can be obtained, and then the first nonzero coefficient can be decoded; the subscript value of the first nonzero coefficient may be increased by 1, namely POS+Run+1, and the starting scanning position of the next run-length Run can be obtained, then, continue to decode the next run-length Run to get the scanning position of the next nonzero coefficient. For the remaining nonzero coefficients, step S130 to step S150 are executed until the decoding of the quantization block is completed.

An embodiment of the present disclosure also provides a video decoding method, comprising:
    decoding a bitstream to get division information, prediction information and quantization blocks;
    obtaining predicted image blocks through prediction technologies according to the prediction information;
    performing inverse quantization and inverse transformation on the quantization blocks to obtain residual image blocks;
    adding a residual image block to a corresponding predicted image block to obtain a reconstructed image block;
    performing deblocking filtering on the reconstructed image formed by reconstructed image blocks to obtain a reference image for reference in subsequent frames;
    It also includes that the quantization blocks are decoded from the bitstream by the above-mentioned quantization block decoding method.

Specifically, in a specific application scenario, in a video decoding process, a bitstream may be parsed to obtain prediction modes, reference frame indexes, motion vectors, quantization blocks and other information of each coding unit. In the process of parsing the bitstream, the quantization blocks are obtained according to the method described in the embodiments of this specification. According to the prediction modes, the reference frame indexes, the motion vectors and other information, predicted image blocks PRED may be generated. Perform inverse quantization and inverse transformation operations on the quantization blocks to obtain residual image blocks RESI'. A residual image block RESI' may be added to a corresponding predicted image block PRED to obtain a reconstructed image block RECO. Perform deblocking filtering on the reconstructed image formed by reconstructed image blocks to obtain a reference image for reference in subsequent frames.

Figure 4:
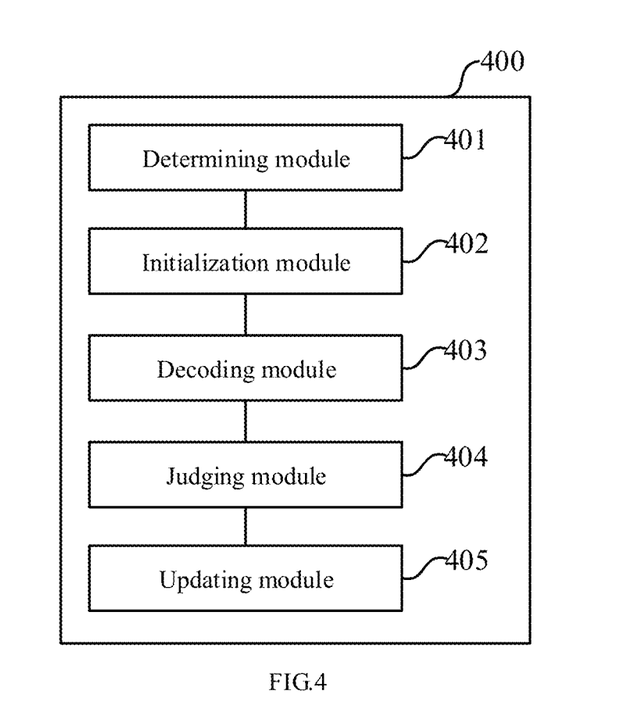
FIG. 4 is a schematic structural diagram of a decoding device for a quantization block according to an embodiment of the specification.

Based on the same idea, an embodiment of this specification also provides a decoding device for a quantization block. FIG. 4 is a decoding device for a quantization block provided by an embodiment of the specification. The device 400 includes a processor, configured to mainly execute the following program modules stored in a memory:

determining module 401, for determining the scanning order of quantization coefficients in the quantization block according to a determined scanning method;

initialization module 402, for initializing, according to the scanning order, the scanning position of the quantization coefficients in the quantization block, and decoding a run-length starting from the initial scanning position; wherein the scanning position is a subscript of the quantization coefficients under the scanning order;

decoding module 403, for adding the subscript value corresponding to the current scanning position and the value of the next run-length starting from the current scanning position to obtain a scanning position of nonzero coefficients, decoding the values of the nonzero coefficients;

judging module 404, for judging whether the subscript value of the nonzero coefficients is the maximum subscript value, if yes, ending the decoding of the quantization block; if not, decoding the end flag bit of the quantization coefficients, and judging, according to the decoding result of the end flag bit of the quantization coefficients, whether there are undecoded nonzero coefficients, and if there are no undecoded nonzero coefficients, ending the decoding of the quantization block;

updating module 405, for updating the current scanning position if there are undecoded nonzero coefficients, adding 1 to the subscript value of the decoded nonzero coefficients, which is used as the current scanning position to decode the next run-length starting from the updated current scanning position, and for calling the decoding module.

According to an embodiment of the present description, the determining module 401 may be used for: determining the scanning order of the quantization coefficients in the quantization block according to a zigzag scanning method, so that the two-dimensional quantization block is converted into a one-dimensional array based on the scanning order.

According to an embodiment of the present description, the initialization module 402 is further configured to perform the following operations:

step 310: pre-configuring a variable, and the initial value of the variable is set as zero;

step 320: parsing a bitstream in turn to obtain binary symbols, and for each binary symbol, judging whether the binary symbol is 1 or not: if yes, setting the current value of the variable as the value of the run-length, and ending the run-length decoding; if not, adding 1 to the value of the variable to obtain an updated current value of the variable, and judging whether the current value of the variable is less than a threshold;

step 330: if the current value of the variable is less than the threshold, returning to step 320;

step 340: if the current value of the variable is greater than or equal to the threshold, parsing the subsequent binary symbol string in a zero-order exponential Golomb code manner to obtain a value corresponding to the subsequent binary symbol string, and adding the value corresponding to the subsequent binary symbol string to the threshold to obtain the value of the run-length, and ending the run-length decoding.

According to an embodiment of the present description, the decoding module 403 is further used for:

After the step of decoding the values of the nonzero coefficients, assigning the values of the nonzero coefficients obtained by decoding to the quantization coefficients at corresponding positions in the quantization block according to the scanning order.

The embodiments of the specification also provide an electronic device, comprising a memory, a processor, and a computer program stored on the memory and capable of running on the processor, wherein, the processor may implement the above-mentioned decoding method for a quantization block when the program is executed.

The specific embodiments of the specification have been described above. Other embodiments are within the scope of the appended claims. In some cases, the actions or steps recited in the claims may be performed in a different order than in the embodiments and may still achieve desired results. In addition, the processes depicted in the figures are not necessarily required to achieve the desired results only in the particular order as shown. In some embodiments, multitasking and parallel processing are also possible or may be advantageous.

The various embodiments in the specification are described in a progressive manner, and the same similar parts between the various embodiments may be referred to each other, and each embodiment focuses on the differences from the other embodiments. In particular, as for the embodiments of the device and the electronic device, since they are basically similar to the method embodiment, the descriptions thereof are relatively simple, and the relevant parts may be referred to the description of the method embodiment.

The device, the electronic device and the method provided by the embodiments of the specification are corresponding, and therefore, the device and the electronic device also have similar beneficial technical effects as the corresponding methods. Since the beneficial technical effects of the method have been described in detail above, the beneficial technical effects of the corresponding device and the electronic device will not be described herein.

The present description is described in terms of flowcharts and/or block diagrams of a methods, devices (systems), and computer program products according to embodiments of the specification. It should be understood that each flow and/or block of the flowcharts and/or block diagrams, and combinations of flows and/or blocks in the flowcharts and/or block diagrams may be implemented by computer program instructions. These computer program instructions may be provided to a processor of a general purpose computer, a special purpose computer, an embedded processor, or other programmable data processing device to produce a machine, and thus, instructions executed by a processor of a computer or other programmable data processing device generate devices for implementing the functions specified in one flow or more flows of the flowcharts or one block or more blocks of the block diagrams.

It should also be noted that the terms "comprise" or "include" or any other variations thereof are intended to encompass a non-exclusive inclusion, lead to a process, a method, a commodity, or a device including a series of elements includes not only those elements but also other elements not explicitly listed, or inherent in the process, the method, the commodity, or the device. Without more restrictions, elements defined by the phrase "include/comprise a . . . " do not exclude the presence of additional identical elements in the process, the method, the commodity, or the device including the elements.

This description may be described in the general context of computer-executable instructions executed by a computer, such as a program module. Generally, program modules include routines, programs, objects, components, data structures, and the like that perform particular tasks or implement particular abstract data types. It is also possible to implement the specification in a distributed computing environment in which tasks are performed by remote processing devices that are connected through a communication network.

The foregoing description of the disclosed embodiments enables those skilled in the art to implement or use the present invention. Various modifications to these embodiments will be obvious to those skilled in the art, and the general principles defined herein can be implemented in other embodiments without departing from the spirit and scope of the present disclosure. Therefore, the present invention will not be limited to the embodiments shown in this document, but should conform to the widest scope consistent with the principles and novel features disclosed in this document.

We claim:

1. A decoding method for a quantization block, comprising:
    step 110: determining the scanning order of quantization coefficients in the quantization block according to a determined scanning method;
    step 120: initializing, according to the scanning order, the scanning position of the quantization coefficients in the quantization block, and decoding a run-length starting from the initial scanning position; wherein the scanning position is a subscript of the quantization coefficients under the scanning order;
    step 130: adding the subscript value corresponding to the current scanning position and the value of the next run-length starting from the current scanning position to obtain a scanning position of nonzero coefficients, decoding the values of the nonzero coefficients;
    step 140: judging whether the subscript value of the nonzero coefficients is the maximum subscript value, if yes, ending the decoding of the quantization block; if not, decoding the end flag bit of the quantization coefficients, and judging, according to the decoding result of the end flag bit of the quantization coefficients, whether there are undecoded nonzero coefficients, and if there are no undecoded nonzero coefficients, ending the decoding of the quantization block;
    step 150: if there are undecoded nonzero coefficients, updating the current scanning position, adding 1 to the subscript value of the decoded nonzero coefficients, which is used as the current scanning position to decode the next run-length starting from the updated current scanning position, and return to the step 130;
    wherein, the step of decoding a run-length comprises:
    step 310: pre-configuring a variable, and the initial value of the variable is set as zero;
    step 320: parsing a bitstream in turn to obtain binary symbols, and for each binary symbol, judging whether the binary symbol is 1 or not: if yes, setting the current value of the variable as the value of the run-length, and ending the run-length decoding; if not, adding 1 to the value of the variable to obtain an updated current value of the variable, and judging whether the current value of the variable is less than a threshold;
    step 330: if the current value of the variable is less than the threshold, returning to step 320;
    step 340: if the current value of the variable is greater than or equal to the threshold, parsing the subsequent binary symbol string in a zero-order exponential Golomb code manner to obtain a value corresponding to the subsequent binary symbol string, and adding the value corresponding to the subsequent binary symbol string to the threshold to obtain the value of the run-length, and ending the run-length decoding.

2. The method according to claim 1, wherein, the step of determining the scanning order of quantization coefficients in the quantization block according to a determined scanning method, comprises:
    determining the scanning order of the quantization coefficients in the quantization block according to a zigzag scanning method, so that the two-dimensional quantization block is converted into a one-dimensional array based on the scanning order.

3. The method according to claim 1, wherein, the threshold is set to 2, 4, 8, 16, or 32.

4. The method according to claim 1, wherein, after the step of decoding the values of the nonzero coefficients, the method further comprises:
    assigning the values of the nonzero coefficients obtained by decoding to the quantization coefficients at corresponding positions in the quantization block according to the scanning order.

5. A video decoding method, comprising:
    decoding a bitstream to get division information, prediction information and quantization blocks;
    obtaining predicted image blocks through prediction technologies according to the prediction information;
    performing inverse quantization and inverse transformation on the quantization blocks to obtain residual image blocks;
    adding a residual image block to a corresponding predicted image block to obtain a reconstructed image block;
    performing deblocking filtering on the reconstructed image formed by reconstructed image blocks to obtain a reference image for reference in subsequent frames;
    further, using the decoding method according to claim 1 to obtain the quantization blocks from the bitstream.

6. A decoding device for a quantization block, comprising a processor, configured to execute the following program modules stored in a memory:
    determining module, for determining the scanning order of quantization coefficients in the quantization block according to a determined scanning method;
    initialization module, for initializing, according to the scanning order, the scanning position of the quantization coefficients in the quantization block, and decoding a run-length starting from the initial scanning position; wherein the scanning position is a subscript of the quantization coefficients under the scanning order;
    decoding module, for adding the subscript value corresponding to the current scanning position and the value of the next run-length starting from the current scanning position to obtain a scanning position of nonzero coefficients, decoding the values of the nonzero coefficients;
    judging module, for judging whether the subscript value of the nonzero coefficients is the maximum subscript value, if yes, ending the decoding of the quantization block; if not, decoding the end flag bit of the quantization coefficients, and judging, according to the decoding result of the end flag bit of the quantization coefficients, whether there are undecoded nonzero coefficients, and if there are no undecoded nonzero coefficients, ending the decoding of the quantization block;

updating module, for updating the current scanning position if there are undecoded nonzero coefficients, adding 1 to the subscript value of the decoded nonzero coefficients, which is used as the current scanning position to decode the next run-length starting from the updated current scanning position, and for calling the decoding module;

wherein, the initialization module is further configured to perform the following operations:

step 310: pre-configuring a variable, and the initial value of the variable is set as zero;

step 320: parsing a bitstream in turn to obtain binary symbols, and for each binary symbol, judging whether the binary symbol is 1 or not: if yes, setting the current value of the variable as the value of the run-length, and ending the run-length decoding; if not, adding 1 to the value of the variable to obtain an updated current value of the variable, and judging whether the current value of the variable is less than a threshold;

step 330: if the current value of the variable is less than the threshold, returning to step 320;

step 340: if the current value of the variable is greater than or equal to the threshold, parsing the subsequent binary symbol string in a zero-order exponential Golomb code manner to obtain a value corresponding to the subsequent binary symbol string, and adding the value corresponding to the subsequent binary symbol string to the threshold to obtain the value of the run-length, and ending the run-length decoding.

7. The device according to claim 6, wherein, the determining module is further configured to perform:

determining the scanning order of the quantization coefficients in the quantization block according to a zigzag scanning method, so that the two-dimensional quantization block is converted into a one-dimensional array based on the scanning order.

8. The device according to claim 6, wherein, the decoding module is further configured to perform:

after the step of decoding the values of the nonzero coefficients, assigning the values of the nonzero coefficients obtained by decoding to the quantization coefficients at corresponding positions in the quantization block according to the scanning order.

9. An electronic device, comprising a memory, a processor, and a computer program stored on the memory and capable of running on the processor, wherein, the computer program can be executed by the processor to perform the method of claim 1.

10. An electronic device, comprising a memory, a processor, and a computer program stored on the memory and capable of running on the processor, wherein, the computer program can be executed by the processor to perform the method of one claim 2.

11. An electronic device, comprising a memory, a processor, and a computer program stored on the memory and capable of running on the processor, wherein, the computer program can be executed by the processor to perform the method of one claim 3.

12. An electronic device, comprising a memory, a processor, and a computer program stored on the memory and capable of running on the processor, wherein, the computer program can be executed by the processor to perform the method of one claim 4.

13. A video decoding method, comprising: decoding a bitstream to get division information, prediction information and quantization blocks; obtaining predicted image blocks through prediction technologies according to the prediction information; performing inverse quantization and inverse transformation on the quantization blocks to obtain residual image blocks; adding a residual image block to a corresponding predicted image block to obtain a reconstructed image block; performing deblocking filtering on the reconstructed image formed by reconstructed image blocks to obtain a reference image for reference in subsequent frames; further, using the decoding method according to claim 2 to obtain the quantization blocks from the bitstream.

14. A video decoding method, comprising: decoding a bitstream to get division information, prediction information and quantization blocks; obtaining predicted image blocks through prediction technologies according to the prediction information; performing inverse quantization and inverse transformation on the quantization blocks to obtain residual image blocks; adding a residual image block to a corresponding predicted image block to obtain a reconstructed image block; performing deblocking filtering on the reconstructed image formed by reconstructed image blocks to obtain a reference image for reference in subsequent frames; further, using the decoding method according to claim 3 to obtain the quantization blocks from the bitstream.

15. A video decoding method, comprising: decoding a bitstream to get division information, prediction information and quantization blocks; obtaining predicted image blocks through prediction technologies according to the prediction information; performing inverse quantization and inverse transformation on the quantization blocks to obtain residual image blocks; adding a residual image block to a corresponding predicted image block to obtain a reconstructed image block; performing deblocking filtering on the reconstructed image formed by reconstructed image blocks to obtain a reference image for reference in subsequent frames; further, using the decoding method according to claim 4 to obtain the quantization blocks from the bitstream.

* * * * *